Nov. 10, 1970  R. F. BRODERICK  3,540,054
RADAR ANTENNA SYSTEM FOR ACQUISITION AND TRACKING
Filed Oct. 9, 1968  2 Sheets-Sheet 1

Richard F. Broderick
INVENTOR

BY
ATTORNEYS

United States Patent Office 3,540,054
Patented Nov. 10, 1970

3,540,054
RADAR ANTENNA SYSTEM FOR ACQUISITION
AND TRACKING
Richard F. Broderick, Houston, Tex., assignor to the
United States of America as represented by the Administrator of the National Aeronautics and Space
Administration
Filed Oct. 9, 1968, Ser. No. 766,170
Int. Cl. G01s 3/48
U.S. Cl. 343—113                                    1 Claim

ABSTRACT OF THE DISCLOSURE

A fine tuning acquisition and tracking interferometer radar antenna system. It includes a first antenna array of at least three receiving antennas. The array includes a receiving antenna, a coarse tuning antenna and a fine tuning antenna, arranged such that the linear spacing distance between the fine tuning antenna and the reference antenna is at least ten times the linear spacing distance between the coarse tuning antenna and the reference antenna. Phase detector means are provided for detecting and comparing the phases of signals received by the reference antenna, the fine tuning antenna and the coarse tuning antenna and producing an electrical output representative of phase differences, whereby the coarse tuning antenna may be used for acquisition and the fine tuning antenna may be used for tracking purposes.

---

The invention described herein was made by an employee of the United States Government and may be manufactured and used by or for the Government for governmental purposes without the payment of any royalties thereon or therefor.

This invention relates to a fine tuning acquistion and tracking interferometer type radar antenna system. More particularly, it relates to the aforesaid interferometer type system in which there is a novel arrangement of the receiving antennas in combination with phase detector means for detecting and comparing the phases of signals received by the aforesaid antennas, whereby the coarse tuning antenna may be used for acquistion and the fine tuning antenna may be used for tracking purposes.

In the past, radar systems have been classified broadly as acquisition and tracking radar systems. The acquisition radar is normally used to acquire an object and has wider angular coverage, sometimes hemispherical. Once an object is acquired, a narrow beam high angular accuracy radar system is pointed in the direction determined by the acquisition radar. This narrow beam tracking radar system then continues to track the object, providing highly accurate angle information. This process of acquiring and tracking an object has normally been performed by the use of two separate radar systems.

Radar systems used in the space environment have weight and size limitations, hence creating the need for combining the aforesaid functions into a single radar system. For example, two such prior approaches are exemplified in the rendezvous radar systems provided for the Gemini spacecraft and the Lunar Module spacecraft developed in the U.S. Government's space program. The Gemini rendezvous radar system has a 70° beam width and consequently can acquire a target within a 70° cone. This radar does not have as high an angular resolution as the Lunar Module rendezvous radar, which has a 3° beam width, but has the requirement of being pointed within the 3° cone by a computer and inertial reference.

With the typical interferometer array of receiving antenna, the line of sight angle is defined in terms of direction cosines (angles of arrival) with respect to two orthogonal axes. These axes are established by the elements of the array. Angle of arrival with respect to an array axis is established by measuring the relative phase delay at the various array elements which define that particular axis. In the past, two elements have been required per axis.

It is therefore an object of this invention to provide an improved fine tuning acquisition and tracking interferometer radar antenna system which combines the functions of both acquisition and tracking in one system, and which meets the space and weight limitations of the space environment.

Briefly stated, this invention is for a fine tuning acquisition and tracking interferometer radar antenna system and includes in combination a first antenna array of at least three receiving antennas. This array includes a reference antenna, a coarse tuning antenna, and a fine tuning antenna aligned on a receiving axis such as an elevation axis or an azimuth axis, for example. Further, the linear spacing distance between the fine tuning antenna and the reference antenna is at least ten times the linear spacing distance between the coarse tuning antenna and the reference antenna. Phase detector means are also provided for detecting the phases of signals received by the reference antenna and by the fine tuning antenna and the coarse tuning antenna and producing an electrical output representative of phase differences therebetween, whereby the coarse tuning antenna may be used for acquisition and the fine tuning antenna may be used for tracking purposes.

In the preferred embodiment, switch means are provided for alternately coupling either the fine or the coarse tuning antenna to the reference antenna and the phase detector means. In addition, means may be provided for applying the aforesaid electrical output to rotate the array in response to changes in said phase differences. Preferred linear spacing differences between the coarse tuning antenna and the reference antenna and between the fine tuning antenna and the reference antenna is in the ratio range of about 1:10 to 1:30. The invention may include two or more arrays of the aforesaid antennas with one array detecting azimuth and one array detecting elevation, for example, which arrays are mounted on a common rotatable ground plane.

Reference to the drawings will further explain the invention wherein like numerals refer to like parts and in which.

Figure 1:
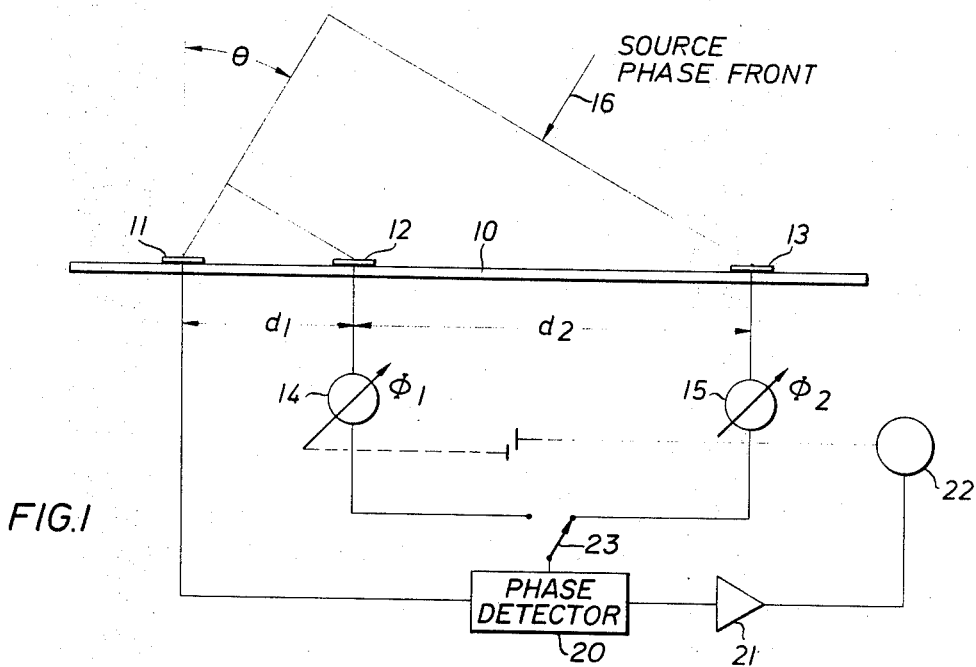
FIG. 1 is a schematic diagram showing the direction-finding geometry of the invention.

By reference to FIG. 1 the basic measuring geometry of the present invention will be described. Considering only one axis, as for example an azimuth axis, an array of three antennas is mounted on a metal ground plane 10 with the three antennas being of the spiral Archimedes type and including reference antenna 11, coarse tuning antenna 12 and fine tuning antenna 13, held initially to receive a source phase front from the direction of arrow 16.

From FIG. 1, the phase of the received sigal at $\phi_1$ (phase shifter 14) is $$\phi_1 = \frac{2\pi}{\lambda} d_1 \sin \theta$$

and the phase at $\phi_2$ (phase shifter 15) is $$\phi_2 = \frac{2\pi}{\lambda}(d_1 + d_2) \sin \theta$$

If $d_1$ is selected to have unambiguous phase over the interval $2\theta$, the $d_1+d_2$ is then selected and has $n$ ambiguities or Equation 2 can be $$\theta = \sin^{-1}\left[\frac{\lambda}{d_1}\left(\frac{\phi_2}{2\pi}+n\right)\right]$$

Considering the basic equation, the signal to noise ratio with respect to element spacing is $$\frac{S}{N} = \left(\frac{\lambda}{nd_1}\right)\frac{1}{2\pi\delta\theta}$$

where $\theta$ is approximately zero degrees.

From Equation 4, it is apparent that for a constant $S/N$ ratio, the angular accuracy ($\delta\theta$) can be increased by the factor $n$ or in other words the angular error obtained with the $d_1$ spacing is reduced by the factor $n$.

Figure 2:
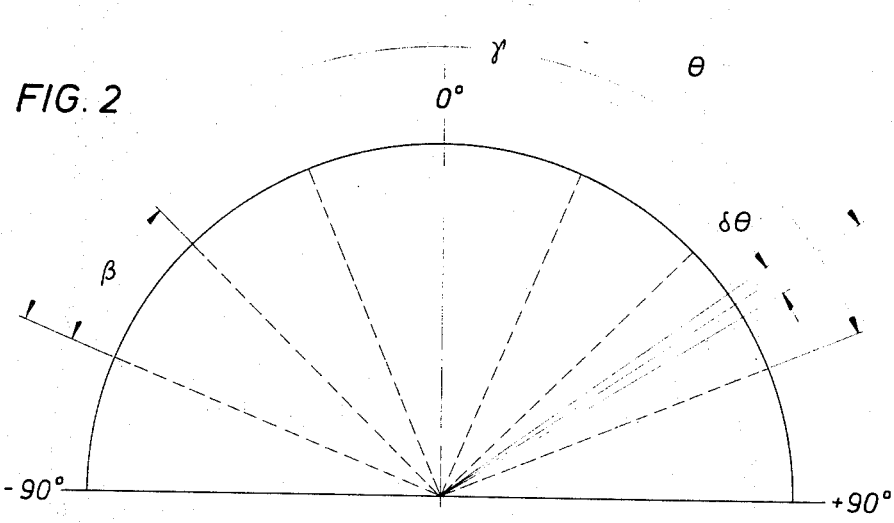
FIG. 2 is a geometric design showing the beam width of the coarse tuning antenna as compared with the fine tuning antenna.

Referring to FIG. 2, the operation is as follows; the narrow spaced antenna 12 at $d_1$ (of FIG. 1) has a wide angle (unambiguous) beamwidth ($\delta$), which is used in the acquisition mode. Once the object or target is acquired and the coarse angle is known, the object is then tracked by antenna 13 in the narrow beamwidth (B), which has $n$ ambiguities within the angle ($\delta$). Although the $S/N$ is maintained constant, the angular accuracy is improved by the factor $n$. Effectively, the basic process of acquiring with a wide angle mode and tracking in a narrow angle mode (high angle accuracy) has been achieved with a single antenna array for each axis.

Figure 3:
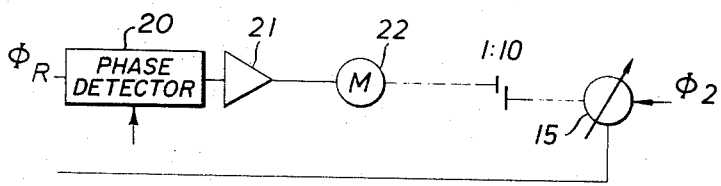
FIG. 3 is a partial schematic view of one portion of the nulling loop circuit arrangement of the invention.

Referring now to FIG. 1 and FIG. 3 in particular, portions of the servo system for positioning or nulling the antenna array will be described. Switch means in the form of switch 23 is arranged for alternately switching between a receiving circuit including either coarse tuning antenna 12 or fine tuning antenna 13, in combination with reference antenna 11. Antenna 11 is coupled directly to a phase detector 20. Antenna 12 is coupled through phase shifter 14 and antenna 13 is coupled through phase shifter 15 to the detector 20. The detector output is directed to a conventional servoamplifier 21 driving servomotor 22 which is coupled through a 1:10 gear reduction drive which is arranged to center ground plane 10 to the null position relative to the phase front, in conventional manner.

From FIG. 1 and FIG. 3, it can be seen that the steady-state or bias error is reduced by loop gain (G) and for the additional element the loop gain is increased by the factor of $n$ and the steady-state error decreased by the factor $n$.

From FIG. 1, it can be seen that the angle ($\theta$) is just approximated with the ($\phi_1$) phase shifter 14 in the nulling loop. The fine tuning and higher angular resolution is obtained by inserting the ($\phi_2$) phase shifter 15 in the nulling loop.

If desired, the spacing could be obtained by several elements and a more complex gear train and hence the method be extended to a sequence of decreasing angular segments, each possessing higher angular resolution.

Figure 4:
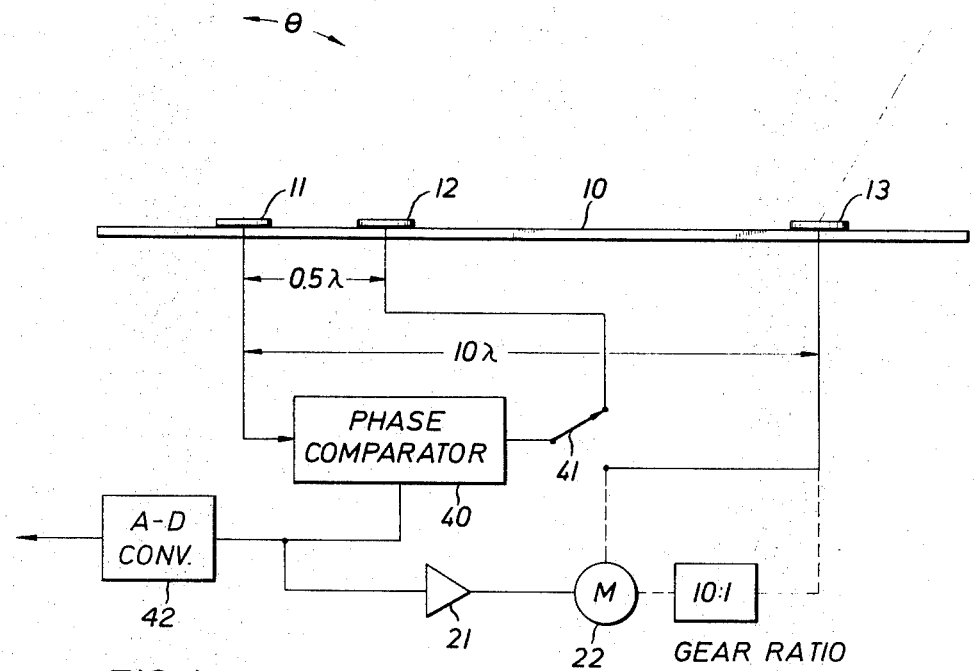
FIG. 4 is a view somewhat similar to FIG. 1, but showing a somewhat modified embodiment of the present invention in schematic form.
Figure 5:
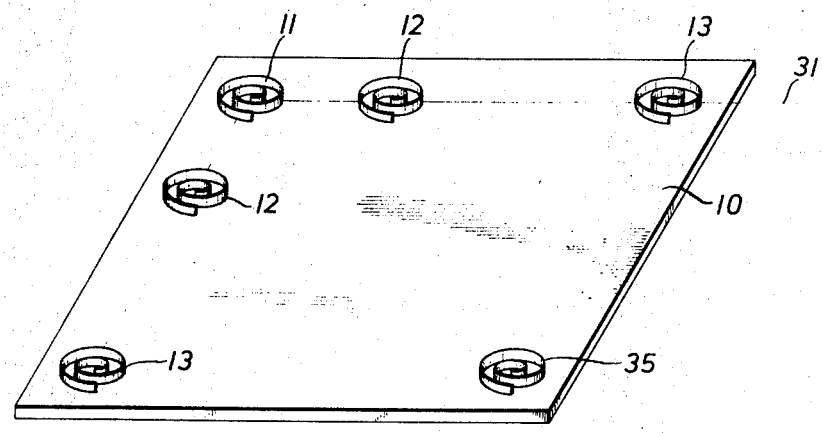
FIG. 5 is a perspective view of one form of the invention showing two antenna arrays, both of which include a common reference antenna.

Referring now to FIGS. 4 and 5, operation of the invention will be explained in reference to a somewhat modified embodiment of the invention. The receiving antennas of the invention are preferably mounted on the top of a rotatable metal ground plane 10 which may be approximately ½" thick and 24" square, where it is contemplated that 20 wavelengths will equal approximately 24". A first array of receiving antennas is mounted along azimuth axis 31 and a second array of receiving antennas is provided along elevation axis 32. Each array includes common reference antenna 11, a coarse tuning antenna 12, and a fine tuning antenna 13. It is to be understood that the antennas may take different forms, but one suitable form is the Archimedes spiral type, preferably ½" in diameter. In addition, the system may include a transmitting antenna 35 mounted transversely from reference antenna 11.

The drawing is not to scale and it is to be understood that the linear distance between a fine tuning antenna 12 and the reference antenna 11 is at least ten times the linear spacing distance between a coarse tuning 12 and reference tuning antenna 11. Stated another way, the linear spacing distance between coarse tuning antennas 12 and reference antenna 11 and between fine tuning antennas 13 and reference antenna 11 is in the ratio range of about 1:10 to 1:30. This ratio range is preferred because of the necessity of having fine tuning capabilities with reduced power requirements, which are provided by this system. The antenna spacing is arranged such that in the wave band under consideration, the distance between the reference antenna 11 and coarse antenna 12 may be on the order of 0.5 wavelength and the distance between reference antenna 11 and fine tuning antenna 13 would be on the order of 10 wavelengths, as is shown in FIG. 4.

Referring now to FIG. 4 in particular, switch 41 is arranged to alternately couple phase comparator 40 to antenna 12 and reference antenna 11 and then to fine antenna 13 and reference antenna 11. Phase comparator 40 is arranged to detect the phase of the signal received at the respective antennas and produce an electrical output responsive to the difference in phases at the respective antennas. The electrical output of phase comparator 40 is then applied to the servoamplifier 21 which in turn drives servomotor 22 through an appropriate gear reduction connected to metal ground plane 10, whereby plane 10 is positioned or nulled. It is to be understood that phase comparator 40, servoamplifier 21, servomotor 22 and appropriate gearing are all mounted behind ground plane 10 for the purpose of rotating the same in response to the electrical output from phase comparator 40.

In other words, servoamplifier 21, servomotor 22 and appropriate gearing are included in the means for applying the electrical output of phase comparator 40 to rotate the array in response to phase differences. In operation, transmitting antenna 35 transmits the signals which are subsequently reflected to the receiving antennas from the tracked target. The tracked target can first be acquired by utilizing the coarse tuning antennas 12 in combinations with reference antenna 11 which thereby roughly positions metal ground plane 10. After acquisition of the target, the system may be switched to include the fine tuning antennas 13 whereby tracking can be accomplished with greater accuracy. Additionally, the output of phase comparator 40 can be applied to an A–D converter 42 as shown for the purpose of indicating the relative position of ground plane 10, for example.

For high angular sensitivity, the spacing between the fine tuning antennas 13 and the reference antenna 11 is selected to be a relatively large number of RF wave lengths, while a shorter spacing is employed between coarse tuning antennas 12 and reference antenna 11 to resolve the angular ambiguities suffered by the initial pair. At least three elements (two element-pairs) are thereby required for each axis, setting a minimum of five elements for the total receiving antenna array, as shown in FIG. 5. It is to be understood that other configurations can be used, as for example a pentagonal array, with the ultimate selection to be based on details of signal processing.

It is thus apparent that this invention effectively provides tracking radar performance with a wide angle system. With respect to use of the invention on a spacecraft, the present invention provides an effective increase in signal to noise ratio to obtain improved angle accuracy without a corresponding actual increase in power output where weight and power are prime considerations.

Further modification may be made in the invention without departing from the scope thereof. Accordingly, the foregoing description is to be construed as illustrative

What is claimed is:
1. In a combined acquisition and tracking interferometer radar system, the combination comprising:
a first antenna array of at least three receiving antennas, said first array including a reference antenna and coarse antennas whose spacings are selected to provide a wide-beam width for acquisition intervals up to 180 degrees, and a fine antenna which is used to increase the signal to noise ratio required to track a target to a higher angular accuracy wherein the linear spacing distance between said fine antenna and said reference antenna is at least ten times the linear spacing distance between said coarse antenna and said reference antenna;
phase detector means for detecting the phases of signals received by said reference antenna, said fine antenna, and said coarse antenna, and producing an electrical output representative of phase differences therebetween, whereby said coarse antenna may be used for acquisition and said fine antenna may be used for tracking purposes; and
switch means for alternately coupling said reference antenna to said coarse antenna for initial acquisition with a 180 degree beam width, and said reference antenna to said fine antenna to increase the signal to noise ratio and thereby increase the angular accuracy measurement without increasing transmitter power at either the tracking or target transmitters.

References Cited

UNITED STATES PATENTS 3,025,520  3/1962  Werner et al.
3,148,369  9/1964  Zable et al. _____ 343—117

OTHER REFERENCES

Thompson, W. J., Ire Transactions on Instrumentation, March 1957, pp. 12–17.

Mengel, J. T., Proceedings of the Ire, June 1956, pp. 755–760.

RODNEY D. BENNETT, Primary Examiner

R. E. BERGER, Assistant Examiner

U.S. Cl. X.R.
343—16, 117